United States Patent [19]

Ahlen et al.

[11] 4,033,202
[45] July 5, 1977

[54] SPEED RESPONSIVE ELECTRONIC CONTROLS FOR TRANSMISSIONS

[75] Inventors: Karl Gustav Ahlen, Stockholm; Rolf Leonard Fabricius-Hansen, Alvsho, both of Sweden

[73] Assignee: S.R.M. Hydromekanik Aktiebolag, Sweden

[22] Filed: Apr. 8, 1974

[21] Appl. No.: 459,179

[30] Foreign Application Priority Data

Apr. 6, 1973 United Kingdom ............ 16734/73

[52] U.S. Cl. ............................ 74/866; 192/103 R; 192/3.31; 235/103.5 E; 310/95; 192/4 A
[51] Int. Cl.² ......................................... B60K 21/00
[58] Field of Search ...... 74/866; 192/103 R, 103 F, 192/104 R, 104 F; 235/103.5 E, 103.5 R; 310/94, 95

[56] References Cited

UNITED STATES PATENTS

| | | | |
|---|---|---|---|
| 2,852,195 | 9/1958 | Coleman et al. | 235/103.5 |
| 2,874,900 | 2/1959 | Linderman | 235/103.5 |
| 3,641,844 | 2/1972 | Wakamatsu et al. | 74/866 |
| 3,673,400 | 6/1972 | Ito | 74/866 |
| 3,710,647 | 1/1973 | Dack et al. | 74/866 |
| 3,750,495 | 8/1973 | Ito et al. | 74/866 |
| 3,752,011 | 8/1973 | Casey et al. | 74/866 |
| 3,752,284 | 8/1973 | Brittain et al. | 74/866 |
| 3,805,640 | 4/1974 | Schneider et al. | 74/866 |
| 3,834,499 | 9/1974 | Candellero | 192/4 A X |

Primary Examiner—Benjamin W. Wyche
Attorney, Agent, or Firm—Larson, Taylor and Hinds

[57] ABSTRACT

An automatic electronic remote control system is provided which is particularly adapted to control the operation of clutches for a hydraulic torque converter in a vehicle. Responsive to operating conditions, the system produces different control signals depending on whether the ratio of the frequencies of two series of pulses is above or below a predetermined value, the pulse frequencies being related to the rotational speeds of the input and output axes of the converter. The system includes two n-bit binary ring counters which respectively receive the two series of pulses, one of the counters being effective to control the other so that a signal representing the actual value of the ratio in question is produced in binary form. This signal is decoded to produce the control signal referred to above.

7 Claims, 10 Drawing Figures

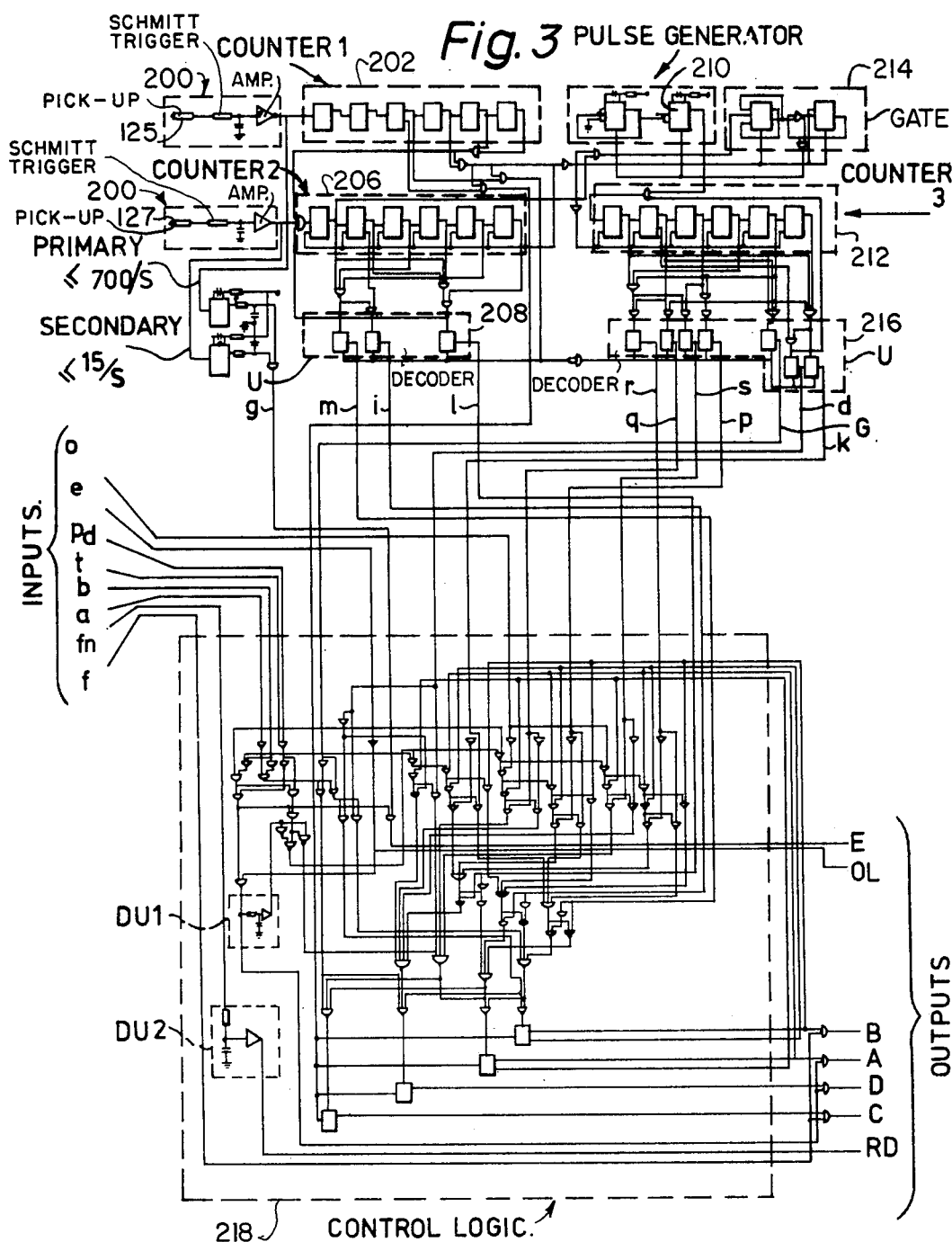

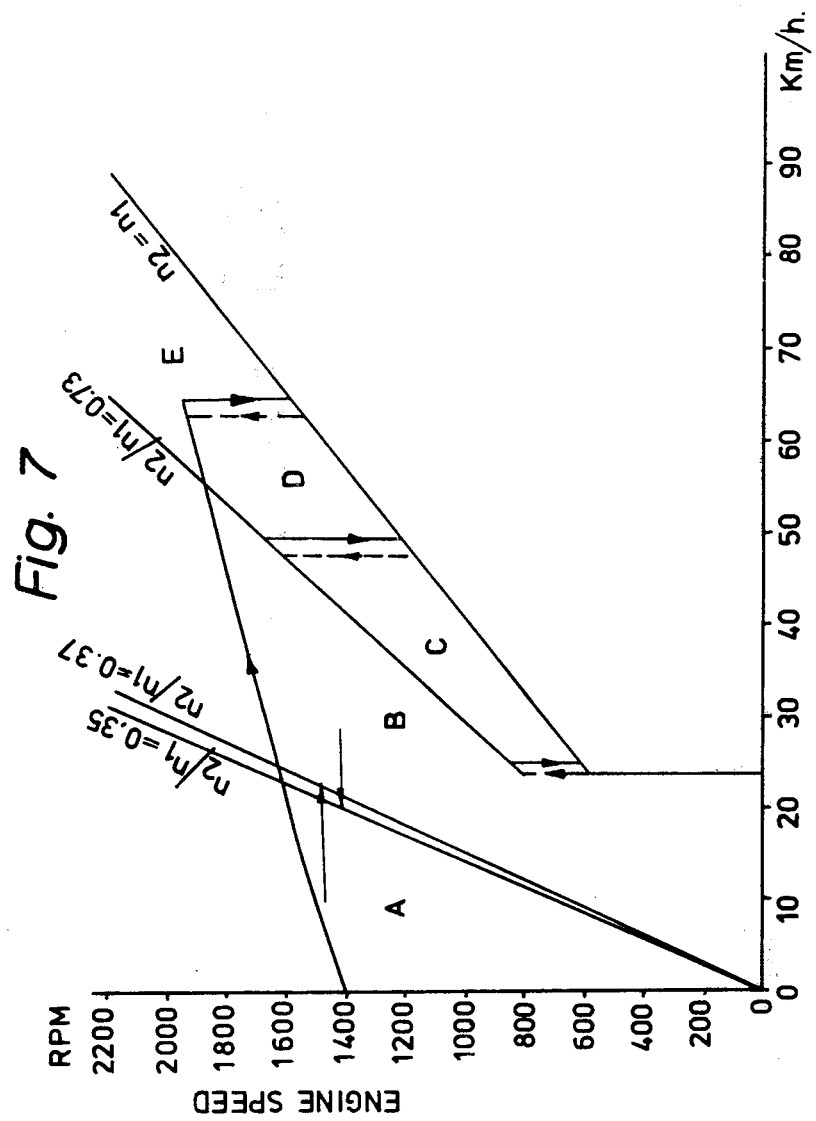

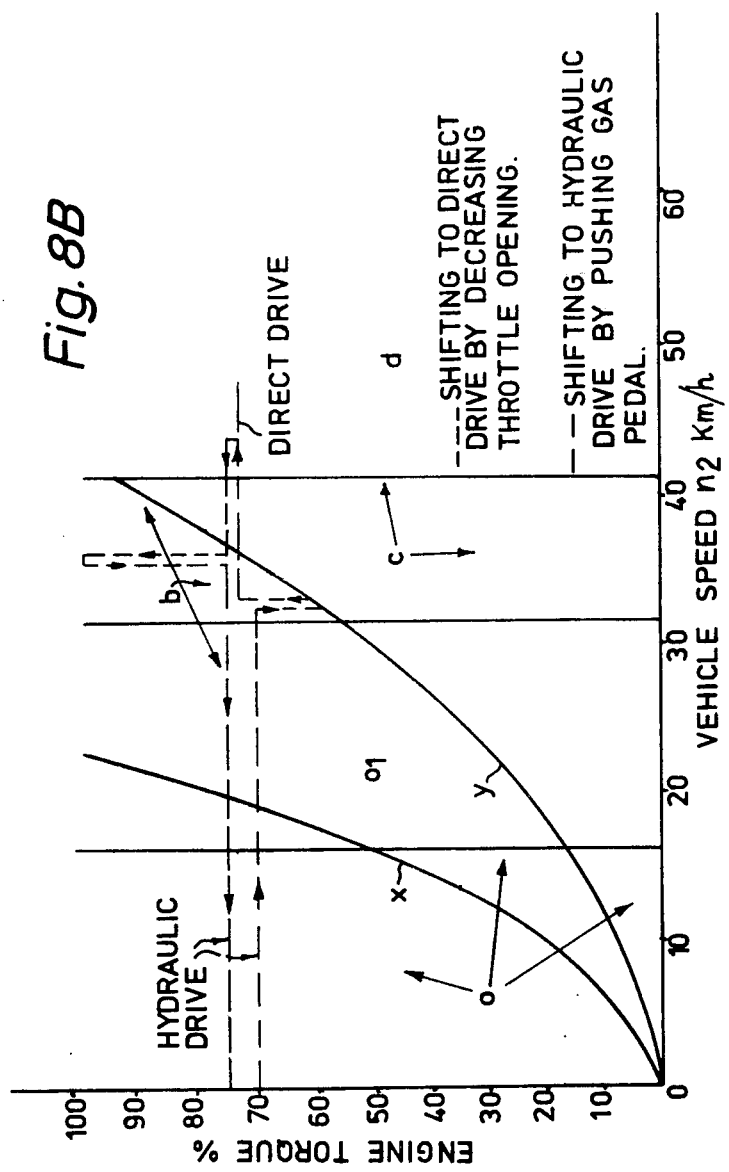

SPEED RESPONSIVE ELECTRONIC CONTROLS FOR TRANSMISSIONS

FIELD OF THE INVENTION

This invention relates to automatic and remote control systems, and particularly to such systems for use with hydraulic torque converter transmissions of motor vehicles such as trucks, buses, oil tankers and the like.

SUMMARY OF THE INVENTION

According to the invention, an automatic and remote control system is provided which comprises means for producing a control signal when the ratio of the frequencies of two series of pulses is either above or below a selected value, the means including two n-bit binary ring counters which, in operation are fed respectively with the two series of pulses, one of the counters being effective to control the other, whereby a signal representing the actual value of the ratio is obtained in binary form. The actual value signal is fed to a decoder, and the control signal referred to above is derived from the output of the decoder.

A preferred embodiment of the invention is arranged and adapted to control the operation, in a motor vehicle, of the various phases of a hydraulic torque converter transmission, such as double rotation drive, single rotation drive, direct drive, reverse drive, free wheeling and braking, which phases under appropriate conditions are automatically brought into operation by simple movement of a control lever in a direction indicating the desired direction of movement of the vehicle. These phases are discussed in more detail hereinbelow. The two series of pulses may be obtained from magnetic detectors which detect the passage of axle mounted gear-type-teeth thereby, the detector preferably including a Schmitt trigger and an operational amplifier.

The output of the decoder may operate an optoelectric change-over switch.

The invention is of particular value for the automatic electronic control of the operation of a vehicle transmission including a hydraulic torque converter or hydraulic gear box.

Other features of the invention will be set forth in, or apparent from, the detailed description of preferred embodiments of the invention found herein below.

BRIEF DESCRIPTION OF THE DRAWINGS

The invention will be hereinafter more fully described, by way of example, with reference to the accompanying drawings, in which:

FIG. 3 is a schematic circuit diagram of an automatic electronic remote control system for controlling the operation of a hydraulic torque converter such as shown in FIG. 1.

FIG. 7 shows graphically the operational shift points of a hydraulic torque converter incorporating an automatic electronic remote control system.

FIGS. 8A and 8B show graphically the relation between vehicle speed and engine speed and torque in a torque converter transmission.

DETAILED DESCRIPTION OF THE PREFERRED EMBODIMENTS

Figure 1:
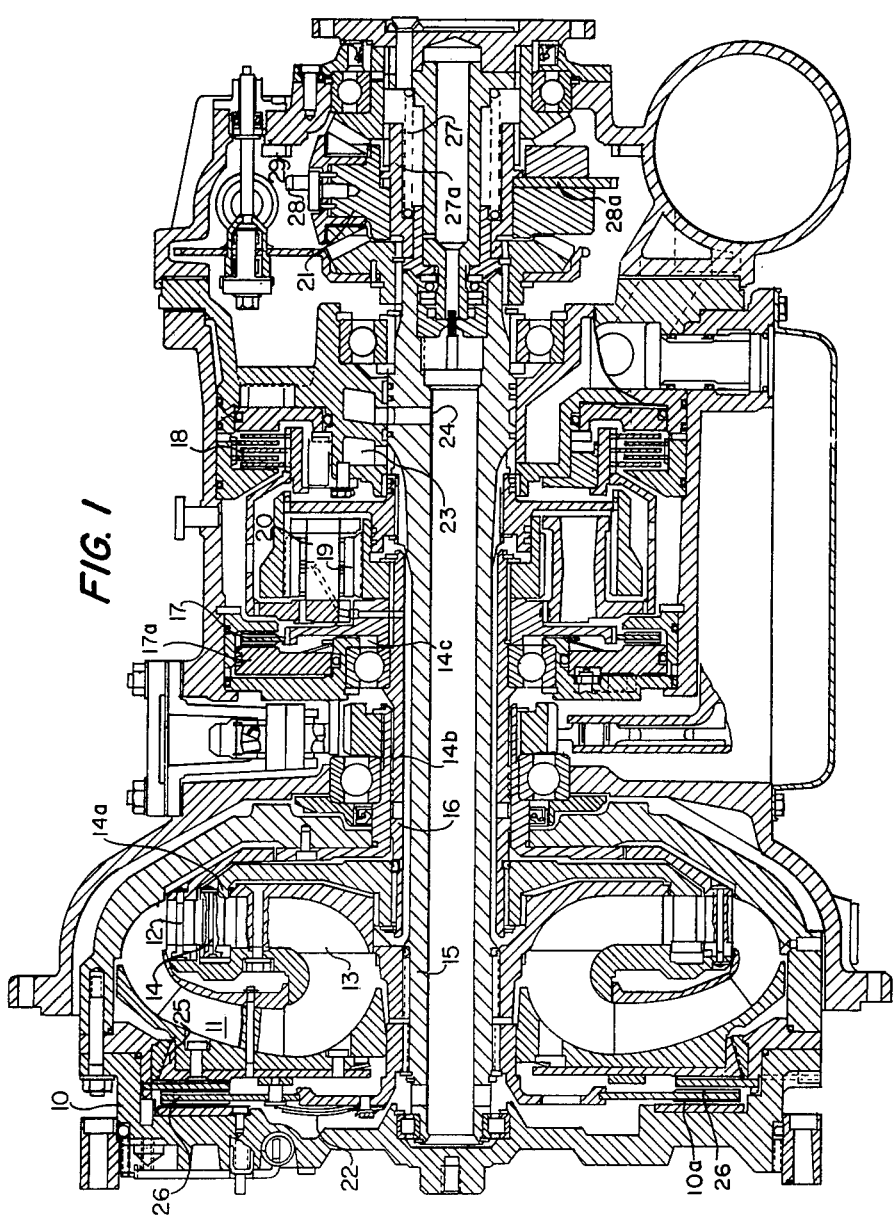
FIG. 1 is an axial sectional view of a torque converter transmission to which the present invention may be applied.

Referring now to the drawings, like elements are represented by like numerals throughout the several views.

A torque converter transmission of the type to which the present invention may be applied and its operation will be described with reference to FIG. 1. The torque converter will not be described in detail since all of the parts shown therein are either previously known or are described in previous commonly owned pending applications or issued patents, which applications and patents will be referred to below and which are incorporated by reference herein.

The torque converter comprises a rotating casing 10, a pump member 11, two sets of turbine blades 12 and 13 and an intermediate guide vane ring 14. The turbine blades are carried by a turbine shaft 15 and the guide vanes are carried by a guide vane shaft 16.

In the illustrated transmission, the pump member 11 is used as a servo-piston either to connect the pump member 11 to the rotating casing 10 for hydraulic drive, to let the pump member rotate freely within the rotating casing in a neutral position or to act as a piston for effecting a direct drive connection between the rotating casing 10 and the turbine shaft 15. Ths releasable pump arrangement is described and claimed in commonly owned U.S. application Serial Number 262,514 now U.S. Pat. No. 3,893,551, filed June 14, 1972. Reference may be had to that application for details thereof. However, to facilitate understanding the present invention, the basic operation of the releasable pump torque converter will be briefly described. Hydraulic drive i.e., through the fluid within the torroidal chamber, is effected by urging the pump member 11 to the right so that it engages the rotating casing 10 at mating conical surfaces 25. Direct drive i.e., drive from the casing 10 directly to the turbine shaft 15 by passing the torque converter chamber is effected by urging the pump member 11 to the left so that it urges a disc member 26 of the turbine shaft 15 into engagement with a frictional surface 10a fixed to casing. The neutral (freely rotating) position of the pump member 11 is effected by moving the pump member 11 to a middle position out of engagement with the conical clutch 25 but not sufficiently far to the left to engage the disc 26 with the surface 10a of rotating casing 10. The said movement of the pump member 11 to the right is effected by introducing pressurized fluid through the passage 24 and through the turbine shaft 15 to the area on the left-hand side of the pump member 11. For direct drive, fluid is introduced through the passageway 23 and through the space between the shafts 15 and 16 to the area within the torque converter chamber to the right of the pump member 11 whereat such fluid urges the pump member 11 to the left. The neutral position is effected by equalizing the pressure of the fluid in the passageways 23 and 24. It will of course be understood that the terms such as "right" and "left" are used only with reference to the specific arrangement of the releasable pump member torque converter and shown in FIG. 1 as other arrangements are also possible.

It will also be understood that the present invention is equally applicable for controlling a torque converter wherein the turbine member containing the turbine blades is releasable from its turbine shaft. The principles of operation for controlling such a torque converter will be essentially the same as for controlling a releasable pump member torque converter and hence will not be described in detail. Such a releasable turbine torque converter is disclosed and claimed in commonly owned U.S. application Ser. No. 348,191 now U.S. Pat. No. 3,839,864, filed Apr. 6, 1973, and the subject matter thereof is incorporated herein by reference for an understanding of such a releasable turbine torque converter.

The torque converter of FIG. 1 is of the so-called double rotating type having one brake 17 for holding the guide vane ring 14 stationary for "single rotation" drive and another brake 18 for holding stationary the axes of planet gears 20 of a planetary gear arrangement for establishing a predetermined speed ratio between the turbine blade ring and the guide vane ring. As is evident from FIG. 1, when brake 17 is closed by urging piston 17a to the right, it locks to the casing in a fixed position the piece 14c which is connected to guide vanes 14 via elements 14a and 14b. For double rotation, closing of brake 18 locks the carrier 18a of a planatary carrier to the casing, causing teeth on piece 14e, which is fixed to vanes 14 via elements 14a and 14b, to engage the teeth 19 of planet gears 20 of the planatary gear to cause guide vanes 14 to rotate.

The transmission of FIG. 1 further includes a forward/reverse gear 21. This forward/reverse gear is described and claimed in great detail in the U.S. Pat. No. 3,734,252 (Ahler), issued May 22, 1973, and hence it will not be described in detail herein. However, the operation will be briefly summarized so as to facilitate an understanding of the present invention. This gear is normally kept in a forward drive position under the action of a spring 27. This spring 27 urges element 27a to the left, this in turn engaging disc 28 at 28a, urging disc 28 to the left, away from fixed dog 29, whereby the entire planatary gear arrangement rotates as a unit about the axis of turbine shaft 15 to effect forward drive. For reverse drive, disc 28 is urged to the right against the force of spring 27 by means of a servo-piston (not shown), into engagement with a fixed gear 29 to fix the location of the axes of the planetary gears of the forward/reverse gear 21, whereby gears 21a turn these planetary gears about their axes to in turn rotate the gear 21b in a direction the reverse of 21a to thereby effect reverse drive.

Figure 2:
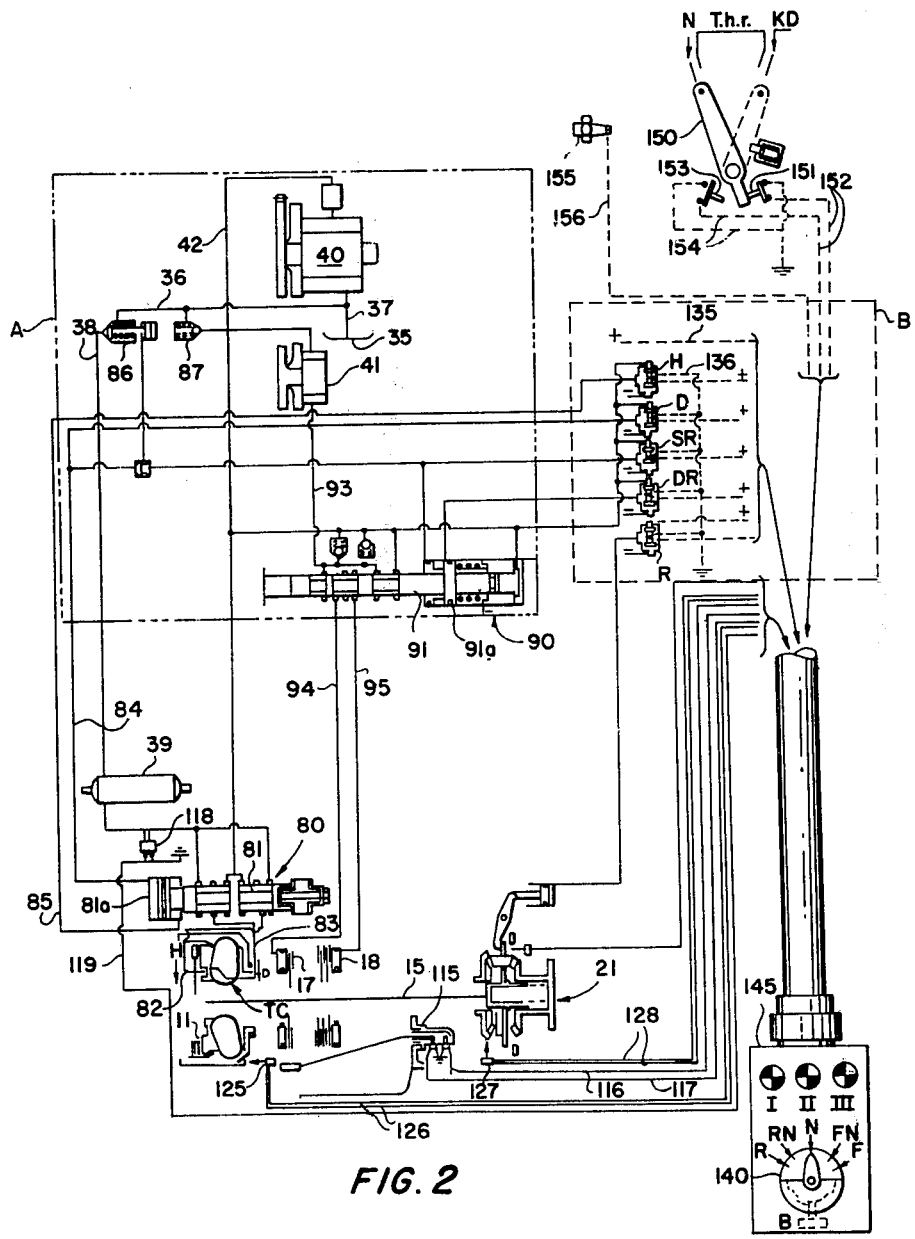
FIG. 2 illustrates schematically an electro-hydraulic-electronic system for remote control of the torque converter of FIG. 1.

FIG. 2 illustrates schematically a remote control system of the present invention which is described in detail in commonly owned U.S. Pat. appliction Ser. No. 401,614 now Pat. No. 3,874,254, filed Sept. 28, 1973. In this drawing, the elements of the torque converter transmission are shown schematically and certain control portions, which are also shown schematically, are grouped within boxes outlined by dot dash lines. The box designated as A which is described in detail in commonly owned U.S. Pat. application Ser. No. 367,378 now Pat. No. 3,844,120, filed June 6, 1973 represents the feeder fluid pump system and the box indicated by the letter B represents the autopilot system.

As described in said copending application Ser. No. 367,378, fluid from the pump 40 which is driven by the primary side of the transmission delivers fluid to a line 42.

In the remote control system of FIG. 2, there are provided solenoid operated valves H for hydraulic drive, D for direct drive, SR for single rotation drive (i.e. engagement of brake 17), DR for double rotation (i.e. engagement of the brake 18) and R for reverse. In addition, the system includes electronic pick-ups 125 and 127 for electronically sensing the speeds of the primary and secondary sides of the torque converter and transmitting these signals via lines 126 and 128, respectively, to the driver's control lever 140 which transmits the appropriate signals to these said solenoid valves.

These solenoid valves H, D, SR, DR, R in turn control the flow of pressurized fluid to a pump member control valve 80 which controls the flow of fluid to the passages 23 and 24 of the torque converter (see FIG. 1) for effecting direct drive, hydraulic drive or neutral therein or to a brake control valve 90 which in turn controls the engagement of single rotation brake 17 or double rotation brake 18.

Drain lines 37 are provided leading back to the line 36 which communicates with the reservoir 35. The system also includes maximum pressure valves 86 and 87 which are part of the normal torque converter system and determine different levels of pressure in the blade systems and are not essential for understanding the present invention and are hence not described in detail.

The basic feeder fluid system also includes a pump 41 which receives fluid from line 42 and in turn delivers fluid via line 93 to the valve 90. This valve 90 includes a spool 91 and a piston member 91a, this valve in turn determining whether pressurized fluid flows through line 94 to engage the brake 17, line 95 to engage the brake 18, or neither of these brakes (the freely rotating position of the torque converter).

The pump member control valve 80 includes a spool 81 and a piston 81a, the latter receiving fluid via line 84 for movement in a first direction (to the right) for direct drive and through a second line 85 for movement to the left to effect hydraulic drive. In the illustrated position, the fluid from line 42 passes through both of the lines 82 and 83 and hence enters both of the passageways 23 and 24 to place the pump member 11 in a neutral, freely rotating position. It will be seen that when the piston 81a moves to the right, fluid from line 42 will enter only the line 83 and will connect the line 82 to reservoir (via line 38, heat exchanger 39, valve 86, and line 36), thereby urging the pump member 11 to the left (as in FIG. 1) to effect direct drive. On the other hand, fluid through line 85 will move the piston member 81a to the left causing fluid from line 42 to pass through line 82 while line 83 is connected to drain, thereby urging pump member 11 to the right (as in FIG. 1) to effect hydraulic drive.

The throttle lever 150 engages a switch 151 in the neutral position and engages a spring position limit device (not shown) and a switch 153 in the opposite end position, i.e. the kick-down position. Lines 152 and 154 transmit the appropriate signals from switches 151 and 153 to the driver's control lever 140. In addition, a pressure switch 155 is connected via line 156 to the driver's valve 140 for hydraulic braking.

Also included is an automatic and remote control box 145 of the bi-metal type containing a multiple circuit switch and three warning lamps I, II and III wherein I is connected to temperature sensor 118 via line 119 to sense oil temperature in drain line 38 while II and III are connected via lines 116 and 117 to oil level indicator 115, with one double, and one electronic control system providing the following features, which system will be described in greater detail below:

a. A control pulse is provided when a predetermined ratio between the number of pulses from the primary and secondary sides is exceeded, and a hysteresis action is provided between up-shift and down-shift, this hysteresis action preferably being speed-ratio responsive.

b. A control pulse is provided at a predetermined ratio between the number of pulses from the primary and secondary sides.

c. Control pulses are provided for operation above selected secondary side speeds.

d. The connection of the pump in hydraulic braking and/or direct modes is overruled or overridden when the switch indicating connection of reverse gear is not in an end position thereof.

e. The circuit for hydraulic braking is closed only when direct drive is connected.

f. Pulses from the throttle end position contact for kick-down are provided for positively disconnecting the direct drive, depending on the position of the highest secondary indicator position.

g. Pulses from the idling throttle position switch are provided which permit the direct drive to be connected down to the lowest secondary side speed component indicator. This switch is preferably connected to the hydraulic braking system when the throttle is not in neutral.

The above described operations are improved wherein the electronic control device is able - without any loss of safety in function - to provide variable disconnection of the direct drive dependent on the throttle position; that is, at higher throttle opening, a higher disconnection point is provided, and at lower throttle opening a, lower disconnection point is provided, following the allowed minimum engine load/speed curve.

Referring to FIG. 3, a schematic circuit diagram of the control system is shown. The control system basically comprises a quotient regulator and a speed responsive regulator which, together with signals derived from detectors associated with the accelerator pedal, the position of the manual gear changer, the reversing indicator, the hydraulic brake and the oil level, as well as the operating condition of the gearbox, determine the operating conditions for each succeeding operation stage.

The quotient regulator of the control system includes a primary detector 200 which preferably comprises an active magnetic pick-up which detects the passage thereby of the teeth of a toothed gear (not shown) on the input axle (not shown) and which produces a square wave output in accordance therewith. The detector 200 preferably includes a Schmitt trigger for "squaring up" the pulses produced by the passage of the gear teeth, and an operational amplifier as illustrated. The number of pulses in the square wave pulse train during a cycle is proportional to the number of gear teeth which pass the magnetic detector 200 during that cycle and hence proportional to the number of teeth in the axle-mounted gear and thus to the speed of rotation of the axle. The pulses so produced, which are termed primary pulses, are counted by binary computer 202 which preferably comprises an n-bit (6-bit) binary ring counter. A secondary detector 204, similar to detector 200, produces output pulses, termed secondary pulses, related to the speed of the gear box axle. A second counter 206, which is similar to counter 202, counts the pulses from detector 204. Counter 202 controls counter 206 and provides starting, stopping and zero or nil position pulses. The counters 202 and 206 begin counting from zero simultaneously and the count produced by counter 206 is proportional to the ratio between the number of revolutions of the input (primary) shaft and the number of revolutions of the output (secondary) shaft. The output of counter 206 is decoded by a speed ratio decoder 208 to provide an input to a logic control network which is indicated by dashed line block 218.

To provide a measurement of the secondary axle speed, a pulse generator 210 is used to generate clock pulses which are counted by a third binary computer or counter 212, which is similar to counter 202 and 206. Counter 212 is activated to receive the clock pulses during two periods of the output signal produced by secondary detector 204. To this end, the output signal from detector 204, after division by two in the first stage of counter 206, is applied to a gate 214 which is also connected to counter 202 and which opens, i.e., provides an output, after the passage of fifty-six primary pulses in a cycle of the signal from counter 202 and which closes before the passage of forty-eight pulses in the cycle of the signal from counter 202. With this arrangement the number of pulses counted by the third counter 212 is inversely proportional to the transmission output speed. The output of counter 212 is decoded by a speed ratio decoder 216 to provide a further input to logic control network 218. To prevent overflow, which may occur in counter 206 during freewheeling operation and in counter 212 at low speeds, a feedback signal is provided which stops the counters after they reach pulse counts of 48 and 60 pulses, respectively.

Figure 4A:
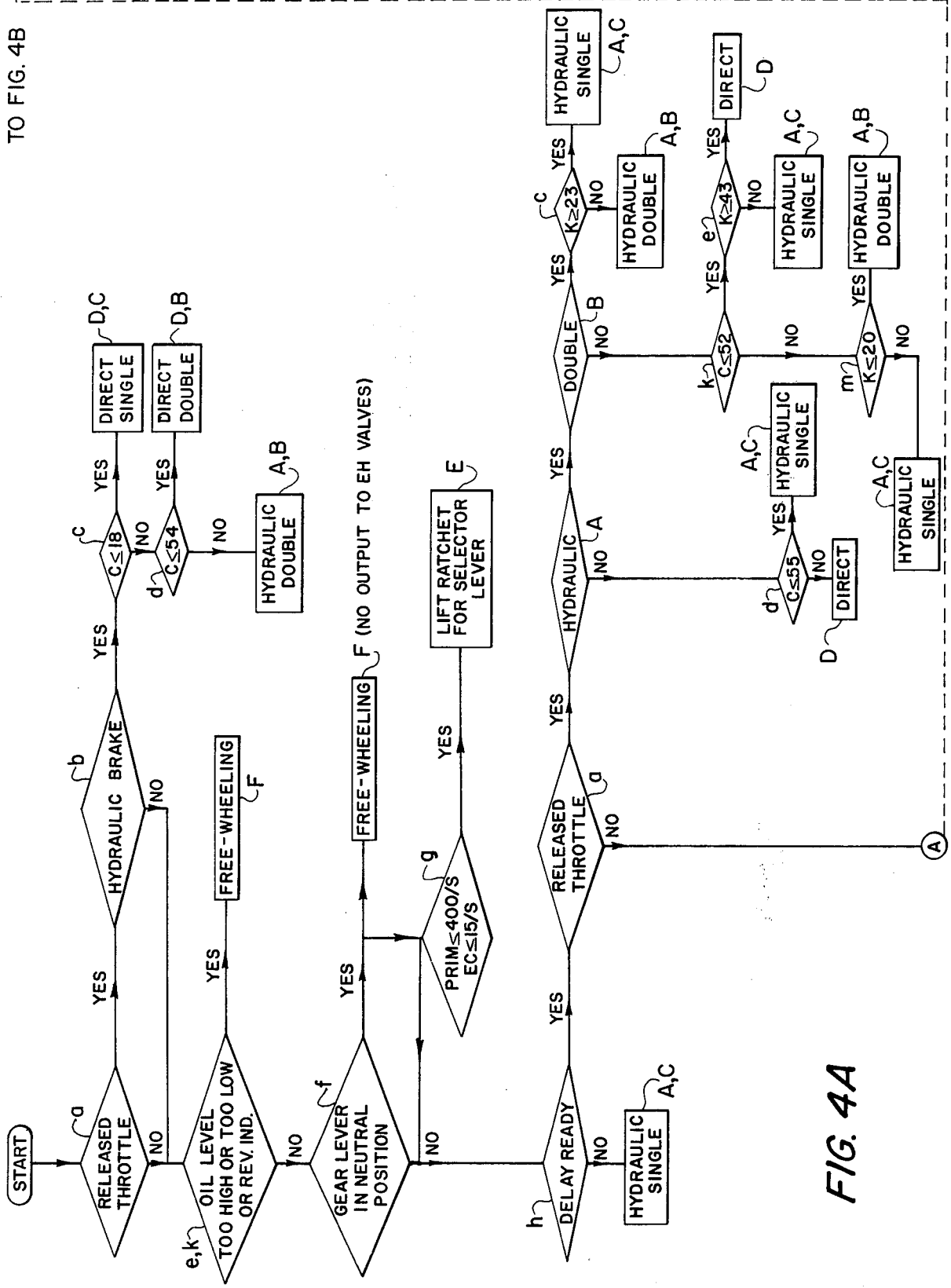
FIGS. 4A and 4B are flow diagrams illustrating the operation of the logic control network of the control system of FIG. 3.
Figure 4B:
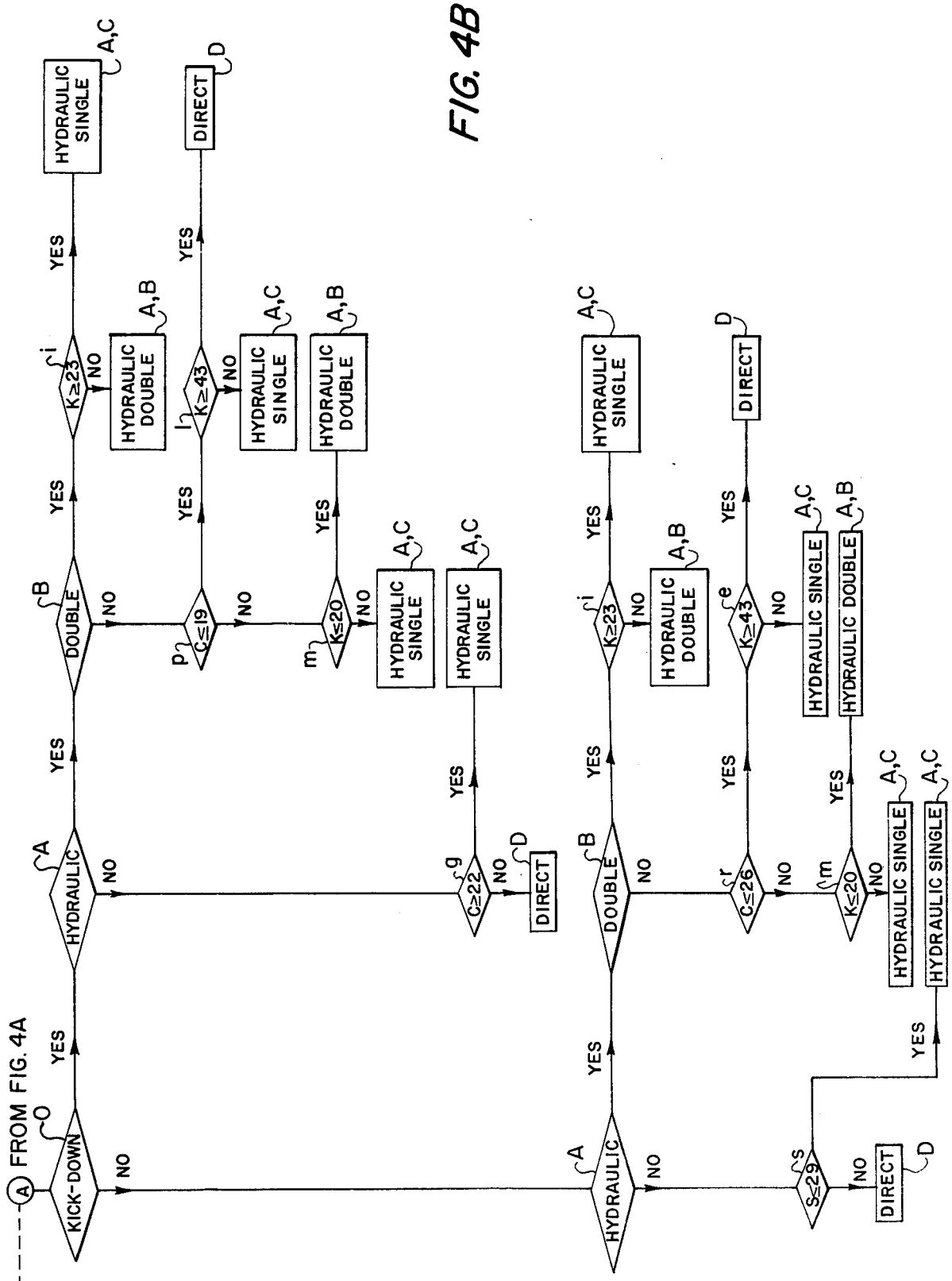

The logic control network 218 processes (1) the internal input signals from the decoders mentioned above (the signals derived from counters 206 and 212), (2) the internal output signals from the preceding cycle and (3) the external input signals discussed above, to provide the requisite gearbox control signals. Logic control network 218 operates on a continuous basis during a counting cycle although new control signals are received thereby only when rocker arms (not shown) are actuated, which occurs after 52 to 55 primary pulses. The operation of logic control network 218 can perhaps be best understood by considering FIG. 4 which is a flow diagram of the logic operation. In FIGS. 3 and 4, input signals are indicated at "0" from "kick-down", at "e" from oil level, at "t" from reverse indicator, at "b" from hydraulic brake, at "a " from released throttle and at "f" from neutral. Other input signals include "pd" from pump disconnection and "fn" from reverse or reverse neutral. Internal signals within the circuit are indicated in FIGS. 3 and 4 as $m$, $i$, $l$, $r$, $q$, $s$, $p$, $g$, $d$, $k$ and $h$. The output signals include those indicated at A for hydraulic drive, at B for double rotation, at C for single rotation, at D for direct drive, and at E for "lift rachet for selector level". Other outputs incuded RD for reverse drive and OL for the oil level warning lamp. The operation of the logic control circuit should be clear from a consideration of FIG. 4 taken with FIG. 3. It is noted that FIG. 4 also indicates the number of pulses at which various of the logic elements are actuated. The chief functions of the logic control network 218 are to provide shifting between double and single rotation modes, shifting between hydraulic and direct drive modes and providing speed and ratio hysteresis at all shift points. The shift points, and consequently the magnitude of the hysteresis, can be selected as desired by making the appropriate connections between the counters and decoders. Other, secondary functions of the logic control network 218 include providing for lifting of the rear catch when the number of primary and secondary revolutions is sufficiently low.

A specific embodiment of the logic control network is shown within dashed line block 218 of FIG. 3. It will be understood that the specific embodiment of the logic control network shown in FIG. 3 is merely exemplary and various modifications and substitutions can be made therein. The logic control network shown in FIG. 5 includes a first delay unit DU1 provides a stabilizing time when the transmission mode is changed from "neutral" to "drive", hydraulic single rotation operation being employed at this time. A second delay unit DU2 ensures that the reverse gear is completely connected or disconnected regardless of further movement of the control lever.

Figure 5:
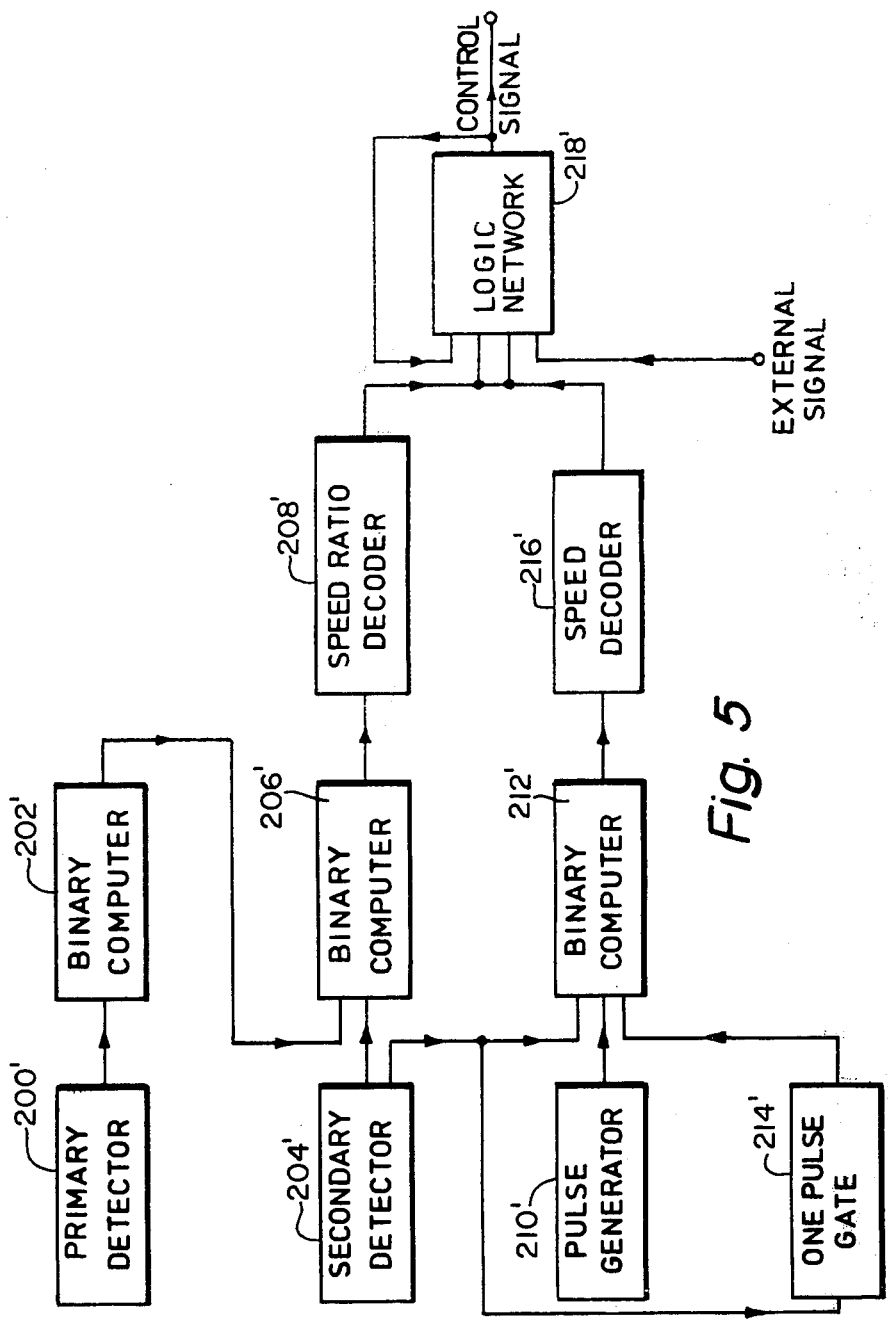
FIG. 5 is a block diagram of alternative embodiment of the control system of FIG. 3.

Referring to FIG. 5, a block diagram of a second embodiment of the control system of FIG. 3 is shown wherein similar elements have been given the same numbers with primes attached. In the embodiment of FIG. 5, the square wave form pulses from primary detector 200', the number of which is proportional to the speed of rotation of the primary shaft, are counted by a 6-bit binary counter 202'. A second similar counter 206' counts the secondary pulses from secondary detector 204' as explained herein above. Counter 206' resets to zero when counter 202' registers fifty-six pulses and is activated or opens when counter 202' begins a new counting cycle (i.e., when the count registered changes from 111111 to 000000). After 48 primary pulses are registered, counter 206' then counts the number of secondary pulses which are then received, this number being proportional to the ratio of the secondary shaft speed to the primary shaft speed. The count registered by counter 206' is decoded by a 6-bit decoder 208' the output of which is connected to control logic network.

To measure absolute speed, the clock pulses froma contact frequency pulse generator 210' are counted by a third counter 212' which receives clock pulses for two periods of the secondary pulse signal. The output of secondary detector 204', after division of four, is connected to a gate 214' which gates out one pulse at the required instance in time, which occurs after fifty-six primary pulses in one computing cycle and before forty-eight primary pulses in the next cycle. The number of pulses passing to counter 212' is thus inversely proportional to the speed of the vehicle. A speed decoder 216' connected to the output of counter 212' decodes the signal from counter 212' to provide an input to logic control network 218'. Any problem of overflow, which can occur in counter 206' during freewheeling operation and in counter 212' at very low speed, is avoided through the use of a feedback signal which provides for stopping counting after 48 or 60 pulses are counted.

As discussed above, internal input signals from the decoders, output signals from the next preceding cycle and the external input signals set forth previously, are processed by control logic network 218' to provide the required control signals. The logic control network 218' operates continuously through a counting or computing cycle but new control signals are received only after 52 to 56 primary pulses.

The following are preferred features of a specific embodiment of the electronic remote control system discussed above:

1. The pick-ups (detectors) for the primary and secondary pulses are of a type providing square wave pulses depending on supply voltage, which means that these pick-ups are practically independent of speed. This enables the use of pulses to, for instance, lift the safety ratchet located in the remote control box to prevent inappropriate switching between forward and reverse gear.

2. These pick-ups are to a high degree independent of the air gap size, at least from zero gap to 1.0 mm.

3. The quotient regulator as well as the speed responsive regulator functions are implemented on a digital system, which means that the remote control system, for present purposes, is not sensitive to temperatures. (Normal $\pm 0° - +75°$ C, or for a higher price, $-50° - +125°$ C) This also means that the system is practically independent of the battery voltage within wide fluctuations.

4. On all pulse shifts a speed, or speed quotient, hysteresis (not time hysteresis) is provided which ensures that the shifts are properly effected and affords a high degree of selectivety in choosing shift values.

5. The elements used in the electronic remote control system are, in addition to being sensitive to temperatures and electrical voltage changes, are protected against voltage peaks by suitable electronic devices.

In a specific preferred embodiment of the remote control system controlling a hydraulic torque converter, the following operations of the torque converter are controlled:

1. The shift between double rotation and single rotation.

2. Connection and disconnection of direct drive under different conditions.

3. Disconnection of the releasble pump at "too high" or "too low" oil levels.

4. Release of the pump, if the reverse gear tends to disconnect from forward to reverse.

5. Preventing operation of the selector lever between forward and reverse positions under conditions where the secondary shaft is rotating above a certain speed and/or the primary shaft is rotating above a certain speed.

6. Choosing a single or double rotation braking mode dependent on the speed of the transmission and providing shifts between single and double rotation modes responsive reductions or increases in speed.

7. For operation in reverse, the control system guarantees that, once a shift is initiated, only full connections and disconnections respectively are carried out completely, independent of eventual reversing of the manually dictated signal.

8. After so-called "freewheeling" operation, the control system guarantees that the hydraulic drive single rotation mode is first effected to reset the engine speed and thereafter the direct drive can be connected under normal conditions.

FIGS. 6, 7, 8A and 8B are graphical representations of various aspects of the operation of the devices and system described above.

Figure 8A:
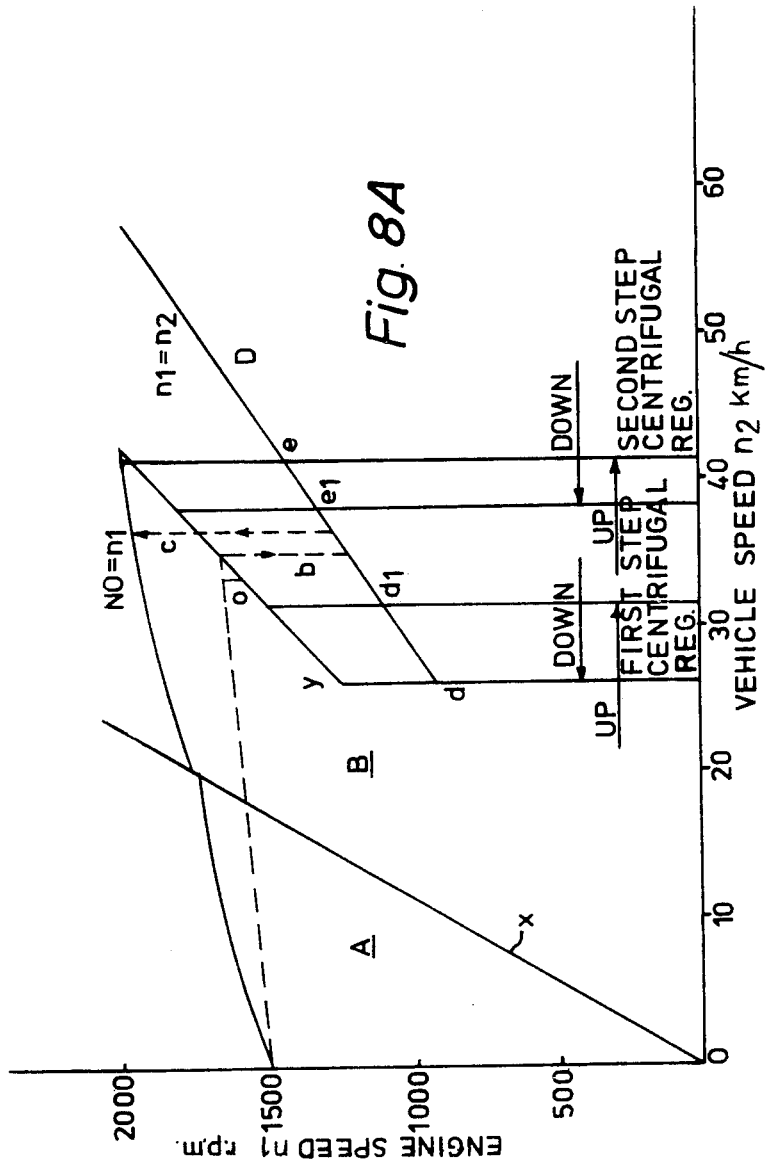

FIG. 8A shows engine speed $n_1$ (in revolutions per minute) plotted against vehicle speed $n_2$ (in kilometers per hour) for input and output·shafts having the same speed, that is, when $n_1 = n_2$, maximum $n_1$ etc., and FIG 8B shows engine torque (in percentage of maximum torque) plotted against the vehicle speed (in kilometers per hour). In FIGS. 8A and 8B, $x$ is the shifting ratio for ratio regulator hydraulic to direct drive, and $y$ is the shifting ratio for ratio regulator double to single rotation.

In the engine speed/vehicle speed graphs of FIG. 8A, point $a$ relates to manual shifting to direct drive by the torque converter, point $b$ relates to automatic shifting to direct drive by the torque converter, point $c$ relates to manual shifting to hydraulic drive by the torque conventer, zone $e$, to $d$ relates to the limits for manual shifting to hydraulic drive by the torque converter, point $d$ relates to automatic shifting to hydraulic drive by the torque converter, and zone $d$, to $e$ relates to the limits for manual and automatic shifting to direct drive by the torque converter.

In the engine torque/vehicle speed graphs of FIG. 8B, zone $a$ relates to hydraulic drive by the torque converter, zone $b$ relates to either hydraulic or direct drive by the torque converter, zones $c$ and $d$ relate always to direct drive the torque converter, the dash line relates to the shift to direct drive by decreasing throttle opening, and the dash and dot line relates to shifting to hydraulic drive.

Figure 6:
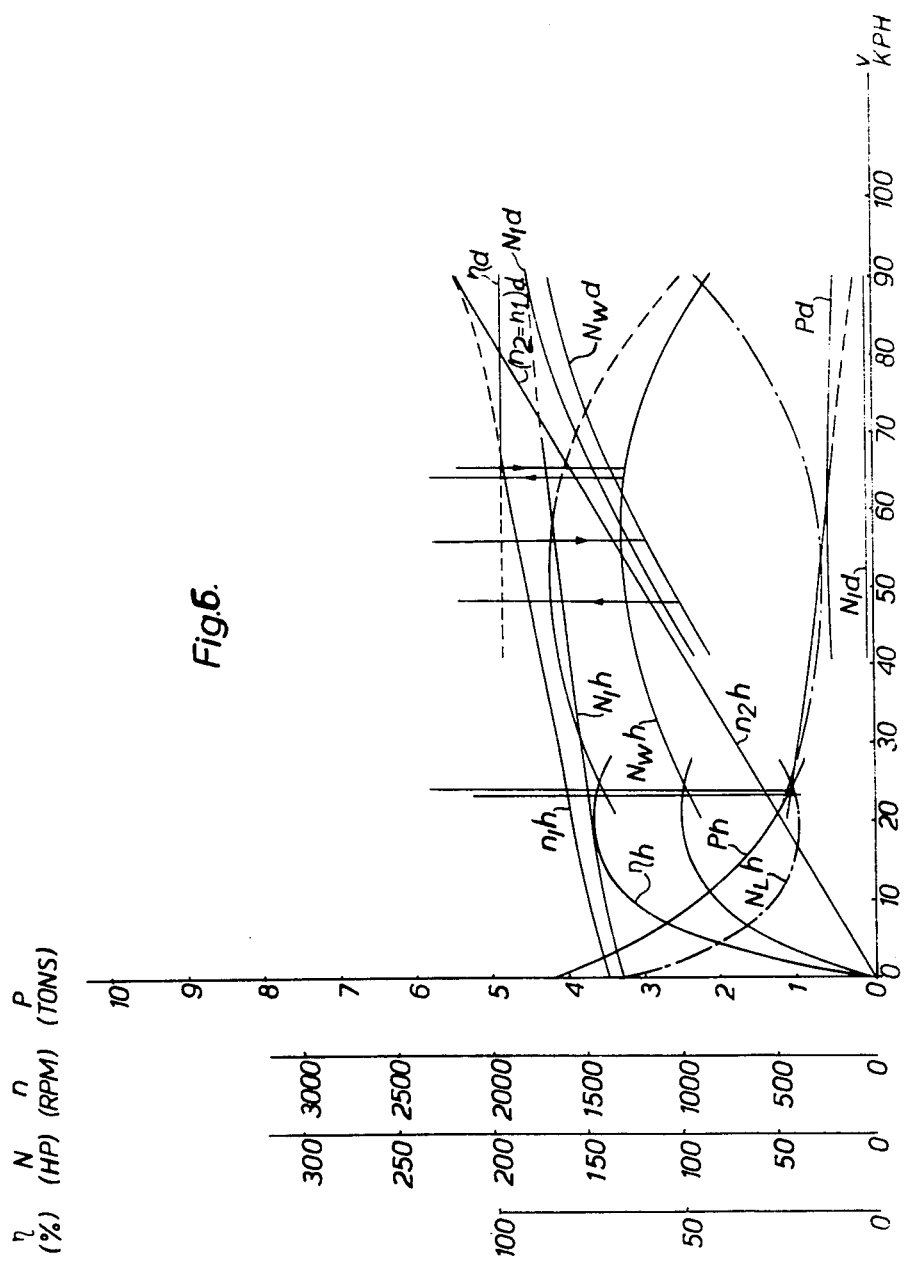
FIG. 6 shows graphically various performance characteristics, for hydraulic and direct drives, of a motor vehicle having a hydraulic torque converter transmission, when controlled by the electronic remote control system of FIGS. 1 to 4.

In FIG. 6, torque converter efficiency (n%), engine power (N) in horsepower, speed (nP in revolutions per minute, and tractive effort at the wheels (P) in tons, are each separately plotted agnast the vehicle speed (v) in kilometers per hour. The engine speed in r.p.m. is designated $n_1$, the output shaft speed in r.p.m. is designated $n_w$, the input power is designated N, the power at the wheels is designated $N_w$, and the power loss in the converter is designated N. The index $H$ indicated hydraulic drive, and the index $d$ indicates direct drive. The graphs are drawn assuming full load, assumed efficiency between converter and wheels as 95%, and assumed mechanical efficiency of converter as 98%.

In FIG. 7, engine speed in r.p.m. is plotted against vehicle speed in kilometers per hour, for various ratios of engine speed ($n_1$) and output shaft speed ($n_2$). Zone A relates to operation by double rotation of the converter, zone B relates to operation by single rotation of the converter, zone C relates to hydraulic drive if the throttle is in the medium or KD (kick-down) position and direct drive if the throttle is in released position, zone D relates to hydraulic drive if the throttle is in KD position and direct drive if the throttle is in the medium or KD position, and zone E relates always to direct drive, by the converter.

The automatic remote control system described herein is especially suitable for use in combination with the remote control system described and claimed in commonly owned U.S. application Ser. No. 401,604, as described above with respect to FIGS. 1 and 2. The automatic remote control system may, however, be used for many different applications where a certain ratio between two speeds determines a change of control pulses.

Referring again to FIG. 2, the pulses and control units used include a pick-up 125 registering the primary shaft speed, a pick-up 127 registering the secondary shaft speed, an end position indicator arrangement for the fuel injection pump regulation lever, including a prestressed spring end position limitation, two switches, if possible without movable parts, a pressure switch for controlling connection of hydraulic braking, a position indicator for the reverse gear, four EH-valves for hydraulic drive, direct drive, single rotation and double rotation, and one EP-valve for reverse, a temperature switch, and grounded wire connections at least for the pick-ups.

Although the invention has been described in considerable detail with respect to preferred embodiments thereof, it will be apparent that the invention is capable of numerous modifications and variations apparent to those skilled in the art without departing from the spirit and scope of the invention.

We claim:

1. A remote control system for controlling the operation of a vehicle transmission including an input shaft operatively connected to a power source and an output shaft operatively connected to the vehicle drive wheels, comprising first sensing means for sensing the rotational speed of said input shaft and producing a first series of pulses in accordance therewith; second sensing means for sensing the rotational speed of said output shaft and producing a second series of pulses in accordance therewith; and control means for producing a control signal when the ratio of the frequencies of said first and second series of pulses is either above or below a selected value, said control means including first and second n-bit binary ring counters which are connected to said first and second sensing means, respectively, and which are fed respectively with the first and second series of pulses, one of the counters directly controlling starting, stopping and return to zero of the other counter such that a signal representative of the actual value of said ratio is obtained in binary form; and a decoder means connected to said other counter for receiving said actual value signal, said control signal being derived from the output of the decoder means.

2. A remote control system as claimed in claim 1 wherein said transmission includes a hydraulic torque converter and a gear box having a gear box axle and said input shaft comprises the input shaft to said torque conventer and said output shaft comprises the gear box axle.

3. A system according to claim 1, wherein said first and second series of pulses are respectively obtained from first and second tooth detectors.

4. A system according to claim 2, wherein each tooth detector comprises an active, magnetic pick-up including Schmitt trigger and an operational amplifier.

5. A system according to claim 1, wherein the output of the decoder provides two limit values, and a logic circuit determines which of the limit values will be used to provide the control signal, the operation of the logic circuit being dependent on at least one external reference signal.

6. A system according to claim 1, wherein said transmission includes a hydraulic torque converter.

7. A motor vehicle having a remote control system according to claim 1.

* * * * *